US012645964B2

(12) United States Patent
Zhang et al.

(10) Patent No.: US 12,645,964 B2
(45) Date of Patent: Jun. 2, 2026

(54) QUANTUM CONTROL SYSTEM, QUANTUM CONTROL PROCESSOR, AND QUANTUM INSTRUCTION SET EXECUTION METHOD

(71) Applicant: Tencent Technology (Shenzhen) Company Limited, Shenzhen (CN)

(72) Inventors: Mengyu Zhang, Shenzhen (CN); Lei Xie, Shenzhen (CN); Yicong Zheng, Shenzhen (CN); Shengyu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 223 days.

(21) Appl. No.: 17/585,329

(22) Filed: Jan. 26, 2022

(65) Prior Publication Data

US 2022/0327413 A1 Oct. 13, 2022

Related U.S. Application Data

(63) Continuation of application No. PCT/CN2021/117616, filed on Sep. 10, 2021.

(30) Foreign Application Priority Data

Apr. 13, 2021 (CN) .......................... 202110393763.7

(51) Int. Cl.
*G06N 10/20* (2022.01)
*G06N 10/40* (2022.01)
(52) U.S. Cl.
CPC ............. *G06N 10/20* (2022.01); *G06N 10/40* (2022.01)
(58) Field of Classification Search
CPC ............................... G06N 10/20; G06N 10/40
See application file for complete search history.

(56) References Cited

U.S. PATENT DOCUMENTS 10,862,465 B1 * 12/2020 Cohen .................. H03K 19/195
11,494,681 B1 * 11/2022 Peterson ................ G06N 10/00
(Continued)

FOREIGN PATENT DOCUMENTS

CN 201274060 Y 7/2009
CN 110490327 A 11/2019
(Continued)

OTHER PUBLICATIONS

Extended European Search Report, EP21835925.5, Sep. 9, 2022, 9 pgs.
(Continued)

*Primary Examiner* — Omar F Fernandez Rivas
*Assistant Examiner* — Tri T Nguyen
(74) *Attorney, Agent, or Firm* — Morgan, Lewis & Bockius LLP

(57) ABSTRACT

This application discloses a quantum control system and an instruction execution method. The quantum control system includes: a scheduler, an instruction memory, a plurality of processing units, and corresponding private instruction caches (PICs). The scheduler is configured to determine k sub-circuits executed in parallel in a quantum circuit, k being an integer greater than 1 and not greater than n; obtain instructions respectively corresponding to the k sub-circuits from the instruction memory, and respectively store the instructions into PICs respectively corresponding to k processing units. A target processing unit of the k processing units is configured to obtain an instruction corresponding to a target sub-circuit of the k sub-circuits from a PIC corresponding to the target processing unit for execution, the k processing units executing respective corresponding instructions in parallel. A solution of sub-circuit-level parallelism disclosed in this application has better scalability when
(Continued)

Quantum algorithm

Quantum high-level language

Quantum compiler

Quantum architecture (quantum control processor)

Control and read electronic instruments

Quantum chip facing more complex quantum applications and ever-increasing qubits.

20 Claims, 5 Drawing Sheets

(56) References Cited

U.S. PATENT DOCUMENTS

| | | | | |
|---|---|---|---|---|
| 2007/0266387 | A1* | 11/2007 | Henmi | G06F 9/4843 |
| | | | | 718/102 |
| 2009/0106755 | A1* | 4/2009 | Chandhoke | G05B 19/052 |
| | | | | 718/100 |
| 2011/0087731 | A1* | 4/2011 | Wong | G06F 9/505 |
| | | | | 709/204 |
| 2013/0138886 | A1* | 5/2013 | Yamauchi | G06F 9/544 |
| | | | | 711/120 |
| 2017/0192780 | A1 | 7/2017 | Valentine et al. | |
| 2018/0246767 | A1* | 8/2018 | Chew | G06F 9/505 |
| 2018/0246851 | A1 | 8/2018 | Zaribafiyan et al. | |
| 2018/0260245 | A1* | 9/2018 | Smith | G06F 9/542 |
| 2019/0042264 | A1* | 2/2019 | Zou | G06F 9/30196 |
| 2019/0042971 | A1 | 2/2019 | Zou | |
| 2019/0042974 | A1* | 2/2019 | Daraeizadeh | G06N 7/01 |
| 2020/0005155 | A1* | 1/2020 | Datta | G06N 5/01 |
| 2020/0012929 | A1* | 1/2020 | Penner | G06N 3/048 |
| 2020/0125402 | A1* | 4/2020 | Griffin | G06F 15/16 |
| 2020/0184023 | A1 | 6/2020 | Delaney et al. | |
| 2021/0012233 | A1 | 1/2021 | Gambetta et al. | |
| 2021/0173660 | A1* | 6/2021 | Hogaboam | G06F 9/3851 |
| 2021/0182725 | A1* | 6/2021 | Zou | G06F 1/0342 |
| 2021/0376835 | A1* | 12/2021 | Vasquez Lopez | G06F 9/4881 |
| 2022/0084085 | A1* | 3/2022 | Rigetti | H04M 15/8214 |

FOREIGN PATENT DOCUMENTS

| | | |
|---|---|---|
| CN | 111753989 A | 10/2020 |
| CN | 111915011 A | 11/2020 |
| CN | 112926741 A | 6/2021 |
| CN | 113326066 A | 8/2021 |
| WO | WO 2021050541 A1 | 3/2021 |

OTHER PUBLICATIONS

Mengyu Zhang et al., "Exploiting Different Levels of Parallelism in the Quantum Control Microarchitecture for Superconducting Qubits", arxiv.org, Cornell University Library, Aug. 19, 2021, 13 pgs.

Sahar Sargaran et al., "SAQIP: A Scalable Architecture for Quantum Information Processors", Quantum Architectures and Computation Group (QACG), Department of Computer Engineering, Shahed University, Tehran, Iran, vol. 16, No. 2, Apr. 18, 2019, XP058673045, 21 pgs.

Toshinari Itoko et al., "Scheduling of Operations in Quantum Compiler", arxiv.org, Cornell University Library, Nov. 10, 2020, XP081810511, 8 pgs.

Xiang Fu et al., "An Experimental Microarchitecture for a Superconducting Quantum Processor", 2017 50th Annual IEEE/ACM International Symposium on Microarchitecture (MICRO), ACM, Oct. 14, 2017, XP033536682, 13 pgs.

Xiang Fu et al., "eQASM: An Executable Quantum Instruction Set Architecture", Aug. 7, 2018, XP055785047, 13 pgs., Retrieved from the Internet: https://arxiv.org/pdf/1808.02449v1.pdf.

Colm A. Ryan et al., "Hardware for Dynamic Quantum Computing", Apr. 26, 2017, 13 pgs.

Nan Wu et al., "Universal Quantum Computer: Theory, Organization and Implementation", Chinese Journal of Computers, vol. 39, No. 12, Dec. 31, 2016, 17 pgs.

Tencent Technology, WO, PCT/CN2021/117616, Dec. 24, 2021, 4 pgs.

Tencent Technology, IPPR, PCT/CN2021/117616, Oct. 12, 2023, 5 pgs.

Tencent Technology, ISR, PCT/CN2021/117616, Dec. 24, 2021, 2 pgs.

Tencent Technology, Korean Office Action, KR Patent Application No. 10-2022-7004548, Feb. 7, 2025, 17 pgs.

\* cited by examiner (a)

(b)

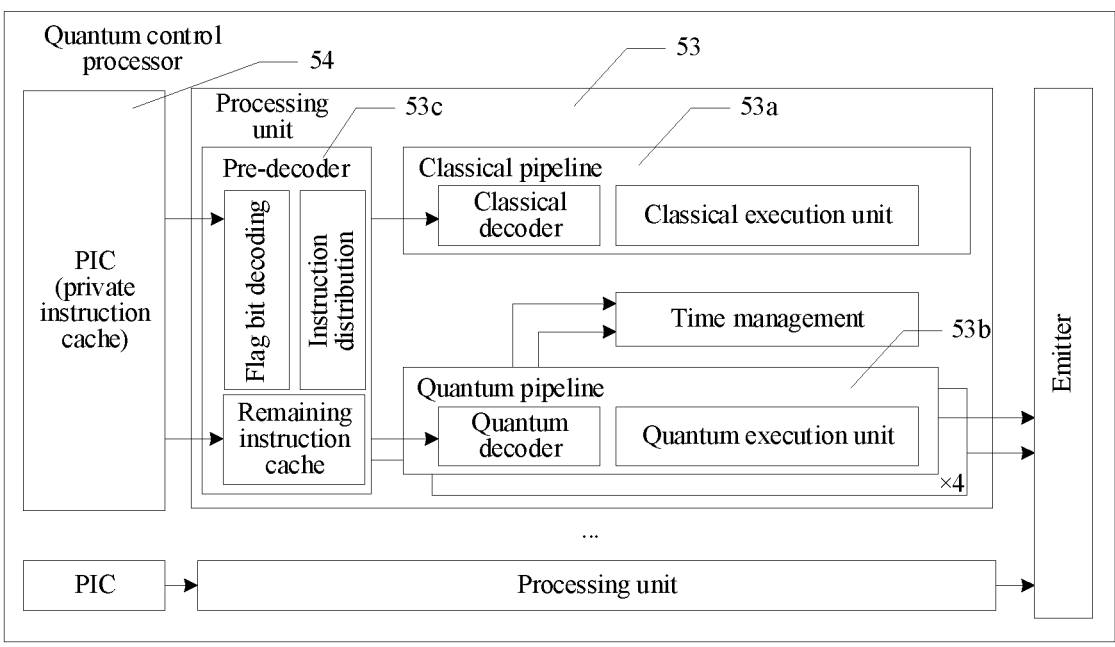

FIG. 8

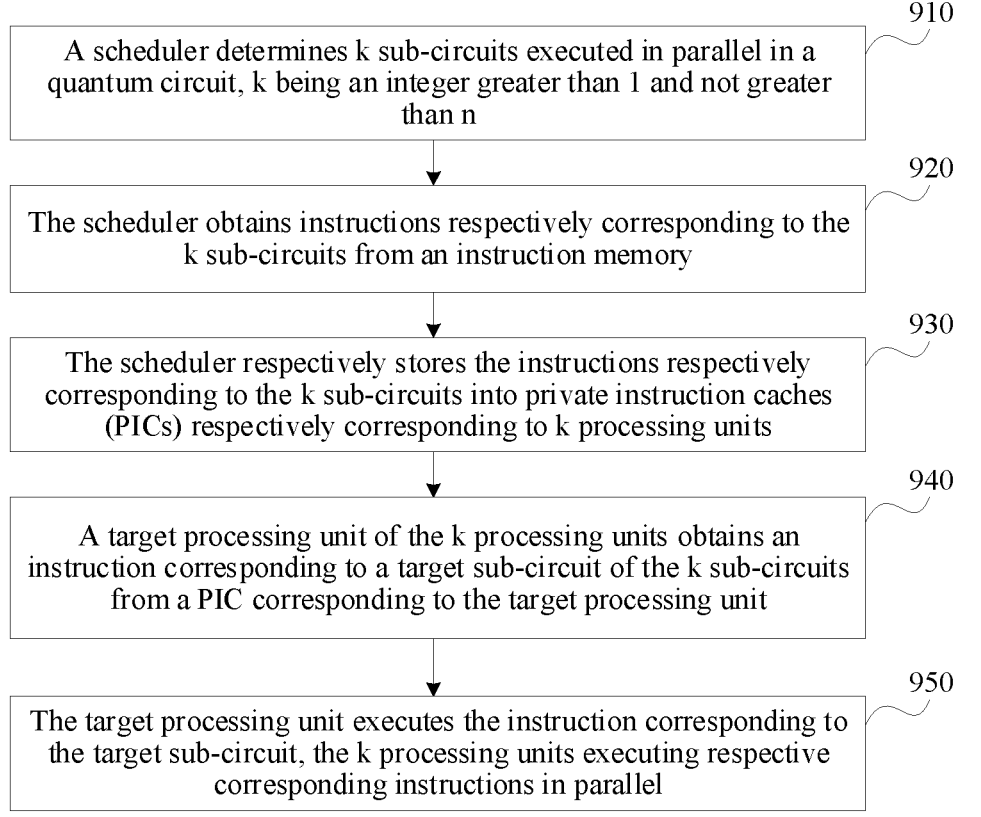

| | |
|---|---|
| A scheduler determines k sub-circuits executed in parallel in a quantum circuit, k being an integer greater than 1 and not greater than n | 910 |
| The scheduler obtains instructions respectively corresponding to the k sub-circuits from an instruction memory | 920 |
| The scheduler respectively stores the instructions respectively corresponding to the k sub-circuits into private instruction caches (PICs) respectively corresponding to k processing units | 930 |
| A target processing unit of the k processing units obtains an instruction corresponding to a target sub-circuit of the k sub-circuits from a PIC corresponding to the target processing unit | 940 |
| The target processing unit executes the instruction corresponding to the target sub-circuit, the k processing units executing respective corresponding instructions in parallel | 950 |

FIG. 9

QUANTUM CONTROL SYSTEM, QUANTUM CONTROL PROCESSOR, AND QUANTUM INSTRUCTION SET EXECUTION METHOD

CROSS-REFERENCE TO RELATED APPLICATIONS

This application is a continuation application of PCT Patent Application No. PCT/CN2021/117616, entitled "THE METHOD OF EXECUTING QUANTUM CONTROL SYSTEM, QUANTUM CONTROL PROCESSOR AND QUANTUM INSTRUCTION SET", filed on Sep. 10, 2021, which claims priority to Chinese Patent Application No. 202110393763.7, filed with the State Intellectual Property Office of the People's Republic of China on Apr. 13, 2021, and entitled "QUANTUM CONTROL MICRO-ARCHITECTURE, QUANTUM CONTROL PROCESSOR, AND INSTRUCTION EXECUTION METHOD", all of which are incorporated herein by reference in their entirety.

FIELD OF THE TECHNOLOGY

Embodiments of this application relate to the field of quantum technologies, and in particular, to a quantum control system, a quantum control processor (QCP), and a quantum instruction set execution method.

BACKGROUND OF THE DISCLOSURE

A quantum control microarchitecture is a specific implementation of a quantum instruction set architecture, and is a solution for executing a given instruction set in a processor.

A quantum control microarchitecture provided in the related art uses a distributed architecture, that is, a compiler generates a corresponding instruction for each qubit, and a control module corresponding to each qubit is combined with a docking analog channel into an independent hardware sub-module. When this system is running, a complete quantum program needs to be converted into a plurality of independent instruction files corresponding to different qubits, which are then executed by corresponding hardware sub-modules. Due to the use of the distributed architecture, this system can resolve a problem of parallelism of instructions during execution, that is, each qubit has an independent module to execute an instruction about the qubit.

However, complexity of the quantum control microarchitecture provided in the related art substantially increases when the number of qubits increases, including complexity of the entire system structure, complexity of synchronization between the hardware sub-modules, and complexity of the compiler. Therefore, it is difficult to maintain scalability as the number of bits increases.

SUMMARY

Embodiments of this application provide a quantum control system, a quantum control processor (QCP), and a quantum instruction set execution method, and provide a quantum control microarchitecture with better scalability and a corresponding instruction execution solution. The technical solutions are as follows:

According to one aspect of the embodiments of this application, a quantum control system is provided, including: a scheduler, an instruction memory, a plurality of processing units, and private instruction caches (PICs) respectively corresponding to the plurality of processing units, the instruction memory storing a quantum instruction set generated by compiling a quantum program corresponding to a quantum circuit, the quantum circuit including n sub-circuits, and the quantum instruction set including instructions respectively corresponding to the n sub-circuits, n being an integer greater than 1; and the scheduler being configured to: determine k sub-circuits executed in parallel in the quantum circuit, k being an integer greater than 1 and not greater than n; obtain instructions respectively corresponding to the k sub-circuits from the instruction memory; and respectively store the instructions respectively corresponding to the k sub-circuits into PICs respectively corresponding to k processing units; and a target processing unit of the k processing units being configured to: obtain an instruction corresponding to a target sub-circuit of the k sub-circuits from a PIC corresponding to the target processing unit; and execute the instruction corresponding to the target sub-circuit, the k processing units executing respective corresponding instructions in parallel.

According to one aspect of the embodiments of this application, a QCP is provided, having the foregoing quantum control system.

According to one aspect of the embodiments of this application, a quantum computer is provided, having the foregoing quantum control system.

According to one aspect of the embodiments of this application, a quantum instruction set execution method is provided, applicable to a quantum control system, the quantum control system including: a scheduler, an instruction memory, a plurality of processing units, and PICs respectively corresponding to the plurality of processing units, the instruction memory storing a quantum instruction set generated by compiling a quantum program corresponding to a quantum circuit, the quantum circuit including n sub-circuits, and the quantum instruction set including instructions respectively corresponding to the n sub-circuits, n being an integer greater than 1; and the method including:

determining, by the scheduler, k sub-circuits executed in parallel in the quantum circuit, k being an integer greater than 1 and not greater than n; obtaining instructions respectively corresponding to the k sub-circuits from the instruction memory; and respectively storing the instructions respectively corresponding to the k sub-circuits into PICs respectively corresponding to k processing units; and obtaining, by a target processing unit of the k processing units, an instruction corresponding to a target sub-circuit of the k sub-circuits from a PIC corresponding to the target processing unit; executing the instruction corresponding to the target sub-circuit; and executing, by the k processing units, respective corresponding instructions in parallel.

The technical solutions provided in the embodiments of this application include at least the following beneficial effects:

The quantum control system provided in this application adopts a solution of sub-circuit-level parallelism. A quantum circuit is divided into a plurality of sub-circuits, and a compiler generates a corresponding instruction for each sub-circuit. For the plurality of sub-circuits that can be executed in parallel in the quantum circuit, the instructions corresponding to the plurality of sub-circuits are executed in parallel by a plurality of processing units. Compared with a solution of bit-level parallelism, the solution of sub-circuit-level parallelism does not lead to a substantial increase in complexity as the number of qubits increases, and therefore has better scalability when facing more complex quantum applications and ever-increasing qubits.

BRIEF DESCRIPTION OF THE DRAWINGS

FIG. 8 is a schematic diagram of a quantum superscalar structure according to this application.

FIG. 9 is a flowchart of a quantum instruction set execution method according to this application.

DESCRIPTION OF EMBODIMENTS

Figure 1:
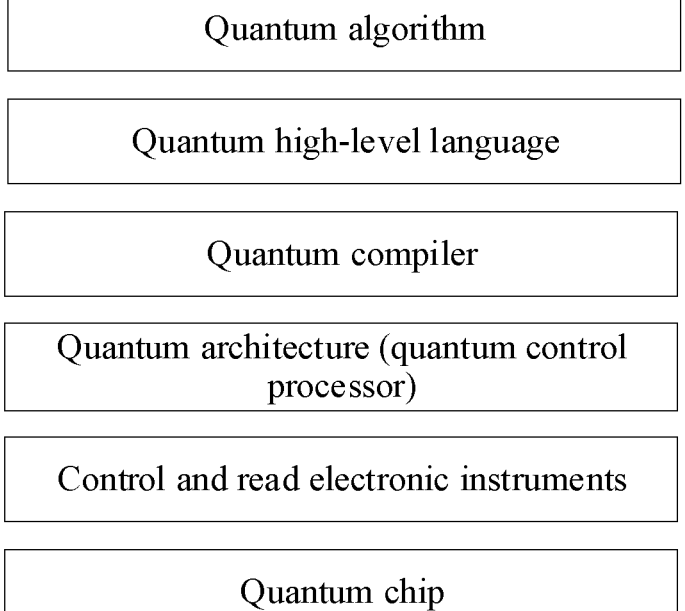
FIG. 1 is a schematic framework diagram of a quantum computer according to this application.

Before the embodiments of this application are described, some terms involved in this application are explained first.

1. Quantum computation is a manner of using superposition and entanglement properties of a quantum state to rapidly complete a specific computation task.

2. Qubit is a basic unit of quantum information, which can be in a superposition state of 0 and 1, and may correspond to a classical bit in classical computation.

3. Quantum gate is a basic quantum circuit that only operates on a small number of qubits. Many quantum gates constitute a quantum circuit, like logic gates in a classical digital logic circuit.

4. Quantum circuit is a circuit formed by performing a series of quantum gate operations on qubits, and finally, it usually needs to read a result of the circuit through measurement. The quantum circuit may be considered as an abstract model of quantum computation.

5. Superconducting quantum computation is a technology that uses a superconducting circuit to implement quantum computation, where a qubit is implemented by using an inductor-capacitor (LC) oscillator circuit based on Josephson junction (an insulator-superconductor sandwich structure), and therefore is referred to as superconducting technology.

6. Noisy intermediate-scale quantum (NISQ) is a quantum computer that is composed of tens to hundreds of qubits and includes a specific degree of noise before implementing quantum error correction.

7. Full-stack quantum computer, like a classical computer, includes several parts such as a quantum high-level language, a quantum compiler, a quantum instruction set, and a quantum chip, to implement seamless collaboration of quantum operations from software to hardware.

8. Quantum instruction set architecture is an architecture describing a quantum operation at an instruction level, including information about a quantum chip, a quantum gate operation, an instruction set, a register, and the like.

9. Quantum control microarchitecture is a specific implementation of a quantum instruction set architecture, and a solution for executing a given instruction set in a processor, which is referred to as "quantum control system" in this application.

10. Quantum control processor (QCP) is a processor that executes a quantum instruction set and completes all control operations on a quantum chip by applying a quantum control system. The QCP is used directly in this application to refer to the quantum control processor. The QCP is a classical processor configured to control a quantum chip, for example, a processor with a Von Neumann architecture, and the quantum instruction set is a classical instruction set used for controlling a quantum chip.

11. Quantum processing unit (QPU) is a processor that can be used for quantum computation, such as a superconducting quantum chip. The QPU is used directly in this application to refer to the quantum processing unit, and the QPU is controlled by a QCP. The QCP is different from the QPU. There are no qubits in the QCP, but there are qubits in the QPU.

12. Quantum assembly is a low-level representation of a quantum instruction, which is similar to an assembly code in a classical computer. Quantum assembly includes basic information that an instruction needs to execute, such as a type of a quantum operation and a corresponding qubit.

13. Quantum compiler is software that converts a quantum high-level language into a quantum instruction, and finally generates a quantum assembly instruction that can be executed on hardware.

14. Quantum high-level language is a high-level language used for describing a quantum circuit, and uses high-level semantics that are easy to be described and compiled, to effectively express complex quantum operations.

15. Quantum chip layout is a specific layout structure of a quantum chip, including information such as the number of qubits and a connection status of qubits that needs to be provided to a quantum compiler and a quantum control system to complete conversion from a quantum program to underlying quantum hardware.

16. Instruction-level parallelism is a method of measuring how many instructions in a computer program can be processed in parallel, usually related to an instruction processing capability of a processor.

17. Task-level parallelism is a model designed for parallel tasks, which completes parallel operation by assigning different tasks to different threads/computing nodes for execution.

18. Computer pipeline divides execution of instructions into several units, which are operated by different circuit modules, and each unit can simultaneously execute different instructions.

19. Superscalar is a technology in a computer architecture that enables a processor to simultaneously fetch a plurality of instructions for processing, and is a parallel computation scheme that can implement instruction-level parallelism. Specifically, a plurality of execution units need to be implemented on hardware. The processor simultaneously distributes a plurality of instructions to be executed in different execution units in each clock cycle, and the hardware detects dependencies between the instructions in real time to determine whether operation is correct.

20. Very long instruction word (VLIW), like the superscalar, is a technical solution for implementing instruction-level parallelism. Different from the superscalar that determines the dependencies between the instructions by hardware, parallel execution of the VLIW is based on a schedule determined by a compiler (software), so that complexity of hardware is lower, but complexity of the corresponding compiler increases.

21. Single instruction multiple data (SIMD) is a technology that uses a plurality of processing units to simultaneously process the same operations that occur on a plurality of sets of data. This technology is widely applied to the design of a classical processor and is a method for improving instruction-level parallelism.

22. Quantum measurement and control system is a system that implements execution of a quantum program by running a quantum instruction set, provides an input signal to a quantum chip for controlling, and measures the quantum chip and acquires a result of the quantum chip. A final output generated by the measurement and control system of the superconducting quantum chip and an input received from the chip are both represented by analog signals.

23. Field programmable gate array (FPGA) is an integrated circuit chip that can be custom-programmed by users. Compared with an application-specific integrated circuit (ASIC) chip (for example, a common central processing unit (CPU)), the FPGA can provide higher flexibility and a faster function implementation speed (a design cycle of the ASIC chip is longer).

24. ASIC is an integrated circuit specially designed and manufactured for some specific functions. Compared with the FPGA, the ASIC has lower power consumption and higher speed, but can only implement specific functions and has a long design and production process.

25. Analog-to-digital conversion is to complete a conversion process from an analog signal to a digital signal (AD), which is mainly used for acquiring a measurement result of a quantum chip in a quantum measurement and control system.

26. Digital-to-analog conversion is to complete a conversion process from a digital signal to an analog signal (DA), which is mainly used for controlling generation of a signal in a quantum measurement and control system. In a superconducting system, a final expression form of a quantum gate is an analog signal of a specific length, which is applied to a superconducting qubit by using the measurement and control system.

27. Feedback control: feedback control of a quantum measurement and control system includes entire steps of acquiring a measurement result from a quantum chip, performing feedback selection logic determining, and transmitting a selected waveform to the quantum chip. A delay of feedback control needs to be as low as possible, especially for the superconducting technology with a short decoherence time, and it is generally expected that the entire feedback can be completed in an order of hundreds of nanoseconds.

FIG. 1 is a structural framework diagram of a quantum computer (or referred to as a full-stack programmable quantum computer) according to an exemplary embodiment of this application. A top layer includes a quantum algorithm, a quantum high-level language, and a quantum compiler, and a bottom layer is a quantum chip (or referred to as a quantum circuit). Similar to a classical computer, to connect the top layer and the bottom layer together, there is a quantum architecture in an intermediate layer. In such a full-stack programmable quantum computer, the quantum architecture (including a quantum instruction set and a quantum control system) plays an important role in communicating quantum software and quantum hardware, and needs to provide functions such as program flow control, feedback control, and precise timing gate operation sequences.

In a specific implementation, the quantum instruction set is generated by a compiler, and the quantum control system is implemented as a QCP on hardware and completes control of the quantum chip by executing the quantum instruction set. An output of the QCP ultimately controls a series of analog instruments (that is, control and read electronic instruments shown in FIG. 1). For example, in a superconducting quantum computing system, the analog instrument herein converts a digital signal into an analog microwave waveform to control the quantum chip.

Figure 2:
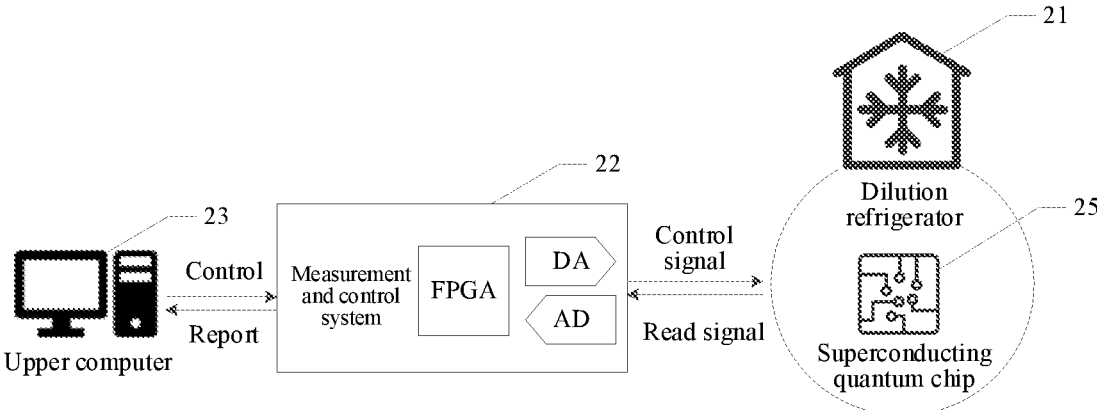
FIG. 2 is a schematic architectural diagram of an experiment platform of a superconducting quantum computer according to this application.

FIG. 2 is a schematic architectural diagram of an experiment platform of a superconducting quantum computer according to an exemplary embodiment of this application. A dilution refrigerator 21 on the rightmost side in FIG. 2 is configured to provide a working environment for a superconducting quantum chip 25, and the superconducting quantum chip 25 works at a temperature of 10 mK. As described above, the superconducting quantum chip 25 is controlled by an analog waveform. Therefore, a measurement and control system 22 mainly composed of an FPGA and AD/DA chips is needed to provide control and measurement. The measurement and control system 22 is controlled by measurement and control software of an upper computer 23. The measurement and control software determines an experiment that needs to be performed at present, and experimental configuration for the measurement and control system 22. The foregoing QCP is disposed in the upper computer 23.

Before the quantum control system is described in detail, it is necessary to describe a relationship between the quantum control system and the measurement and control system. A decoherence time of a superconducting qubit is quite short. At present, in the most advanced technology in the world, the decoherence time can reach about 50 to 100 microseconds. To achieve control fidelity required by fault-tolerant quantum computation, it is necessary to quickly complete operations such as feedback control on the measurement and control system, and it is generally required to complete the operations in an order of hundreds of nanoseconds. Therefore, the quantum control system that executes the quantum instruction set needs to interact with an analog instrument in the measurement and control system in a low-delay manner. Because a feedback control loop includes the following steps: from AD to an instruction set, feedback determining, and then to DA, in a superconducting system, it is impossible to simply implement the quantum instruction set architecture directly on the upper computer. Because interfaces such as peripheral component interconnect express (PCIe) used by a modern CPU usually have overheads of hundreds of nanoseconds at a protocol layer, a delay of a feedback loop becomes unacceptable. Therefore, in this application, the quantum control system is directly implemented on the FPGA in the measurement and control system as a QCP to interact with the analog instrument, so that a low-delay feedback loop becomes possible. Certainly, an ASIC may alternatively be used to implement the quantum control system. However, because current quantum computation technical solutions change fast, and the ASIC has a characteristic of a long development cycle, there is no relevant research using the ASIC in the industry.

The quantum control system using the distributed architecture provided in the related art has the following disadvantages:

1. Due to qubit-level parallelism, each qubit needs to be configured with a corresponding hardware sub-module. If a quantum chip includes a large number of qubits (for example, tens or even hundreds of qubits), the quantum chip needs to be configured with the same number of hardware sub-modules as the qubits, resulting in a significant increase in complexity of the entire system structure.

2. Due to the use of the distributed architecture, synchronization of operations between different hardware sub-modules (or referred to as different qubits) further requires a master control trigger distribution hardware module (referred to as "master control module") to complete time alignment. For this, corresponding instructions such as waiting and synchronization are also added. After a quantum program starts running, when different hardware sub-modules need to synchronize or transmit measurement results, the master control module needs to be used for performing trigger distribution and data transmission. Similarly, as the number of qubits increases, complexity of synchronization between the hardware sub-modules also increases synchronously.

3. Because the compiler needs to generate a corresponding instruction for each qubit, as the number of qubits increases, complexity of the compiler also increases synchronously.

Based on the disadvantages, it is difficult for the quantum control system using the distributed architecture provided in the related art to maintain scalability as the number of bits increases.

The quantum control system provided in this application adopts a solution of sub-circuit-level parallelism. One quantum circuit may be divided into a plurality of sub-circuits, and each sub-circuit is configured to implement some functions in the quantum circuit. Each sub-circuit may be configured to control one or more qubits. For example, the quantum circuit may be divided into the sub-circuits from the perspective of a structure or a functional module of the quantum circuit.

In this application, the quantum circuit is divided into the plurality of sub-circuits, and the compiler generates a corresponding instruction for each sub-circuit. For the plurality of sub-circuits that can be executed in parallel in the quantum circuit, the instructions corresponding to the plurality of sub-circuits are executed in parallel by a plurality of processing units. Compared with the solution of bit-level parallelism, the solution of sub-circuit-level parallelism does not lead to a substantial increase in complexity as the number of qubits increases, and therefore has better scalability. In addition, in an optional embodiment of this application, a type of parallel processing on quantum operation instruction-level performed using a quantum superscalar architecture is further provided, so as to provide a required quantum operation instruction for a QPU within a specific period of time. In a final design solution of the quantum control system, the quantum architecture can be expanded to control hundreds of bits or more.

In a classical computer, when it is impossible to continue to increase a clock frequency and the number of executable instructions per clock cycle, technicians begin to explore the use of a multi-core processor to continue to improve processor performance, and provide the so-called thread-level parallelism concept. For a multi-core processor, parallelism is improved by allowing the cores to execute different threads (or processes). Certainly, the premise is that the tasks are relatively independent. In the classical computer, a compiler or an operating system is usually used to schedule a plurality of tasks in a program, and evenly assign the tasks on the cores to achieve maximum parallelism.

Figures 3, 4:
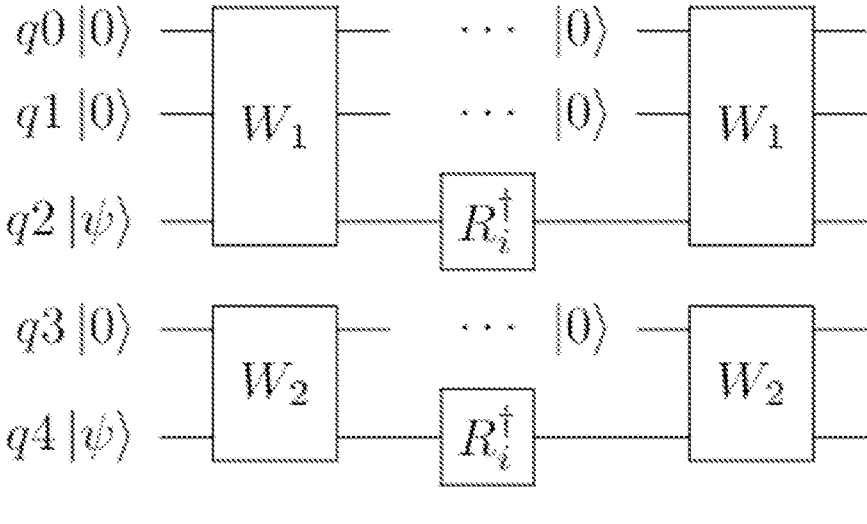
FIG. 3 exemplarily shows a schematic diagram of a quantum circuit.
FIG. 4 is a schematic diagram of an execution result corresponding to the quantum circuit shown in FIG. 3.

However, in a quantum computer, it is also found in this application that a quantum circuit may include a plurality of sub-circuits that need to be processed simultaneously. To better describe the problem, a quantum circuit shown in FIG. 3 is used as an example in this application, including a repeat-until-success (RUS) sub-circuit $W_1$ corresponding to qubits 0 to 2 (that is, q0, q1, and q2 in the figure) and an RUS sub-circuit $W_2$ corresponding to qubits 3 and 4 (that is, q3 and q4 in the figure). RUS is a process of repeating some quantum operations until an expected quantum state is obtained, which may be used as a method for implementing arbitrary quantum gates with finite quantum operations. The $W_1$ circuit is used as an example. It is necessary to perform a series of quantum operations included in the circuit first, and then measure the two ancilla qubits q0 and q1. If a measurement result shows a failure (that is, no expected quantum state is obtained), a recovery operation is performed on a data qubit q2 to return q2 to an initial state, and then the above process is repeated until the measurement result is successful. In this case, it is considered that execution of the circuit is completed. The quantum circuit shown in FIG. 3 includes two RUS sub-circuits, and the two sub-circuits do not have any data dependency, and can theoretically be executed in parallel.

Because the RUS sub-circuit includes a feedback control operation (that is, a position to which an instruction pointer jumps in the quantum program is determined in the next step after the measurement result of the quantum circuit is returned to the QCP), when an existing single-core-based system is used to execute the quantum program corresponding to the quantum circuit shown in FIG. 3, no operations are performed on the sub-circuit $W_2$ in the entire program before the operation on the sub-circuit $W_1$ is completed. This is because the single-core system has only one program flow pointer, and this pointer is always "congested" in an instruction of the sub-circuit $W_1$ until the measurement result of the quantum circuit is successful.

Therefore, a result of execution of this program is the quantum circuit shown in FIG. 4, that is, the execution of the sub-circuit $W_1$ is completed first, and the execution of the sub-circuit $W_2$ is then completed. This is obviously not the expected result. In addition, a longer idle time of a qubit indicates that more errors are accumulated. Therefore, if the two RUS sub-circuits are executed sequentially, an error rate of a final result is greater than that of a result of parallel execution.

The problem herein cannot be resolved by simply increasing an instruction processing speed of the QCP, because the feedback control operation herein involves an interaction between the QCP and a quantum chip (that is, a quantum circuit). Therefore, even if the QCP has a capability of simultaneously processing operations on five qubits, in this case, it still needs to wait for the quantum chip to return a result before performing the next step. This is the reason why the problem is referred to as sub-circuit-level parallelism.

Figure 5:
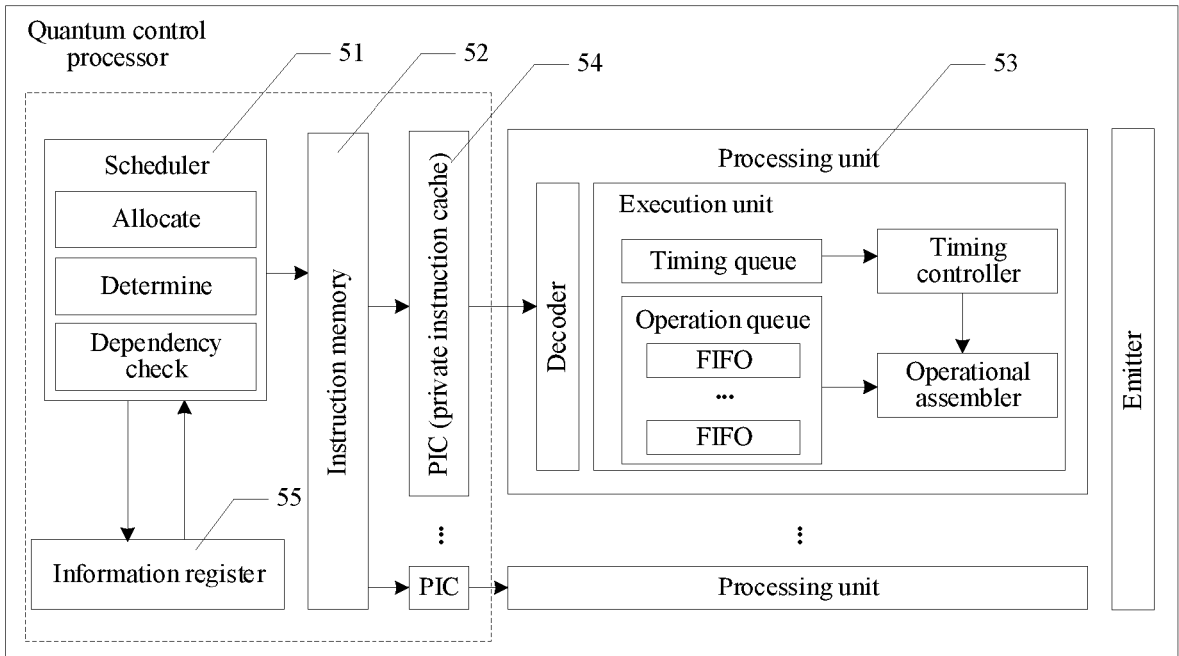
FIG. 5 is a schematic diagram of a quantum control system according to this application.

FIG. 5 is a schematic diagram of a quantum control system according to an exemplary embodiment of this application. The quantum control system includes: a scheduler 51, an instruction memory 52, a plurality of processing units 53, and private instruction caches (PICs) 54 respectively corresponding to the plurality of processing units 53.

The instruction memory 52 stores a quantum instruction set generated by compiling a quantum program corresponding to a quantum circuit. For example, a compiler compiles a quantum program corresponding to a quantum circuit, to generate a quantum instruction set, and stores the quantum instruction set into the instruction memory 52. The instruction memory 52 may also be referred to as a main memory, and all instructions generated by compiling a quantum program corresponding to a quantum circuit are stored in the instruction memory 52, and can be shared by all processing units 53.

The quantum control system provided in this application includes a plurality of processing units 53. Each processing unit 53 has a respective independent PIC 54 for storing instructions executed by the processing unit 53. In addition, each processing unit 53 may further have a respective independent program counter, register, execution unit, and the like. In the foregoing manner, the processing units 53 do not affect each other when executing circuits.

In this embodiment of this application, the quantum circuit includes n sub-circuits, and the quantum instruction set includes instructions respectively corresponding to the n sub-circuits, n being an integer greater than 1. One quantum circuit may be divided into a plurality of sub-circuits, and each sub-circuit is configured to implement some functions in the quantum circuit. Each sub-circuit may be configured to control one or more qubits. For example, the quantum circuit may be divided into the sub-circuits from the per-spective of a structure or a functional module of the quantum circuit.

The scheduler 51 is configured to: determine k sub-circuits executed in parallel in the quantum circuit, k being an integer greater than 1 and not greater than n; obtain instructions respectively corresponding to the k sub-circuits from the instruction memory 52; and respectively store the instructions respectively corresponding to the k sub-circuits into PICs 54 respectively corresponding to k processing units 53.

A target processing unit of the k processing units 53 is configured to: obtain an instruction corresponding to a target sub-circuit of the k sub-circuits from a PIC corresponding to the target processing unit; and execute the instruction cor-responding to the target sub-circuit, the k processing units executing respective corresponding instructions in parallel.

In an exemplary embodiment, as shown in FIG. 5, the quantum control system provided in this application further includes an information register 55. The information register 55 stores at least one of the following information: instruc-tion address information and sub-circuit timing information.

In some embodiments, the information register 55 stores instruction address information respectively corresponding to the n sub-circuits, the instruction address information being used for indicating a storage address of an instruction corresponding to a sub-circuit in the instruction memory 52. For example, instruction address information corresponding to a specific sub-circuit includes a start address and an end address of an instruction corresponding to the sub-circuit in the instruction memory 52, so that the scheduler 51 can conveniently fetch the instruction corresponding to the sub-circuit from the instruction memory 52 to a PIC 54 corre-sponding to a processing unit 53 based on the instruction address information. For example, the scheduler 51 obtains instruction address information respectively corresponding to the k sub-circuits from the information register 55, and obtains the instructions respectively corresponding to the k sub-circuits from the instruction memory based on the instruction address information respectively corresponding to the k sub-circuits.

In some embodiments, the information register 55 stores sub-circuit timing information corresponding to the quan-tum circuit, the sub-circuit timing information being used for indicating an execution sequence of the n sub-circuits. The scheduler 51 is configured to read the sub-circuit timing information from the information register 55, and determine, based on the sub-circuit timing information, the k sub-circuits executed in parallel in the quantum circuit. An instruction of a quantum operation needs to include timing information, so that when processing the instruction, the QCP can transmit the quantum operation to the quantum circuit at a definite time. Therefore, the sub-circuits also need to include respective timing information, not only to extend the timing information of the instruction, but also to help the scheduler 51 to determine which sub-circuits can be processed in parallel. The quantum circuit such as the RUS sub-circuit cannot obtain a definite execution time before running. Therefore, relative timing information is selected in this application to specify an execution sequence, that is, dependencies, between the sub-circuits.

Table 1 exemplarily gives an example of a format of information stored in the information register 55. By reading relevant information of sub-circuits $W_1$ and $W_2$, the sched-uler respectively fetches instructions of the two sub-circuits to PICs of a processing unit 1 and a processing unit 2, and reading of a sub-circuit $W_3$ needs to be executed after execution on the first two sub-circuits (that is, $W_1$ and $W_2$) is completed. The scheduler fetches an instruction of the sub-circuit $W_3$ to a processing unit for execution after waiting for the processing units 1 and 2 to complete the execution of the two sub-circuits. Similarly, a sub-circuit $W_4$ is executed after the execution on the sub-circuit $W_3$ is completed.

TABLE 1

| Sub-circuit | Instruction start address | Instruction end address | Dependent circuit |
|---|---|---|---|
| $W_1$ | 0 | 10 | No |
| $W_2$ | 11 | 20 | No |
| $W_3$ | 21 | 40 | $W_1$, $W_2$ |
| $W_4$ | 41 | 60 | $W_3$ |

When the quantum program starts running, the scheduler 51 constantly reads content in the information register 55 to allocate different program blocks (that is, instructions cor-responding to different sub-circuits) to the processing units. The first step in the scheduler 51 is to perform dependency check. A specific representation method of the dependency is first described herein. One of the most direct representa-tion methods is to represent each dependent circuit with one bit. Using an example in which a quantum circuit includes a total of n sub-circuits, in this representation method, a dependency corresponding to each sub-circuit is represented by n bits. For example, in the example in Table 1, depen-dencies of $W_1$ and $W_2$ are 4 bit 0000, a dependency of $W_3$ is 4 bit 0011, and a dependency of $W_4$ is 4 bit 0100. A disadvantage of this method is that when the number of sub-circuits increases, storage required to represent the dependency in the information register 55 also increases linearly, and it is difficult to expand when the circuit is complex.

In another possible implementation, priority is used to represent dependency more concisely. The sub-circuit tim-ing information includes priorities respectively correspond-ing to the n sub-circuits, where sub-circuits with the same priority can be executed in parallel, and sub-circuits with different priorities cannot be executed in parallel. For example, in the example in Table 1, priorities of the four sub-circuits $W_1$, $W_2$, $W_3$, and $W_4$ are 0, 0, 1, and 2, and are shown in Table 2 below:

TABLE 2

| | Sub-circuit | | | |
| | $W_1$ | $W_2$ | $W_3$ | $W_4$ |
| --- | --- | --- | --- | --- |
| Priority | 2 bit 00 | 2 bit 00 | 2 bit 01 | 2 bit 02 |

The sub-circuits with the same priority mean that the sub-circuits can be processed in parallel. In this case, the scheduler 51 uses a priority counter with an initial value of 0 for dependency check, and a sub-circuit with the same value as the counter can enter a next step through this step. After all sub-circuits with a current priority are executed, the value of the counter is increases progressively, thereby starting scheduling of the remaining sub-circuits. The method of representing dependency by priority is used. Assuming that the n sub-circuits included in the quantum circuit have a total of s different priorities (s being a positive integer), a dependency corresponding to each sub-circuit is represented by p bits, p being the smallest positive integer that makes $2^p$ greater than or equal to s. For example, when s is 3 or 4, p is 2; and when s is any integer from 5 to 8, p is 3. It can be seen that the use of the priority can represent the dependency more concisely, which helps to reduce bit storage overheads required for the sub-circuit timing information.

In addition, a result of the dependency check is then used to determine to which processing unit the instruction corresponding to the sub-circuit is allocated. In this application, a series of state registers may be used to represent states of the sub-circuits, including states such as "wait", "in-execution", and "done". Initial states of all sub-circuits are wait states. When a specific sub-circuit passes the dependency check and there is currently an idle processing unit, a state of the sub-circuit changes to an in-execution state. An execution completion signal returned by the processing unit may be used for indicating start of processing of the following sub-circuits, for example, the progressive increase of the priority counter described above.

In a process that the scheduler 51 distributes instructions corresponding to the sub-circuits, the instruction corresponding to each sub-circuit is fetched from the instruction memory 52 to the PIC 54 of each processing unit 53. After completing execution of a current sub-circuit, the processing unit 53 needs to switch to a next sub-circuit to be executed. Obviously, a specific period of time needs to be spent to fetch the instruction to the cache again, and may exceed an expected time for the quantum operation to start execution in the next sub-circuit. To reduce the overheads, this application provides the following solutions: The scheduler 51 determines, when the k sub-circuits are in an in-execution state, a to-be-executed sub-circuit executed after the k sub-circuits in the quantum circuit; obtains an instruction corresponding to the to-be-executed sub-circuit from the instruction memory 52; and stores the instruction corresponding to the to-be-executed sub-circuit into an idle PIC corresponding to an execution processing unit, the execution processing unit belonging to the k processing units. That is, in this application, each processing unit 53 may be accordingly configured with two PICs, so that one of the PICs may store an instruction corresponding to a sub-circuit that is in-execution, and the other PIC can pre-store an instruction corresponding to a next to-be-executed sub-circuit.

Figure 6:
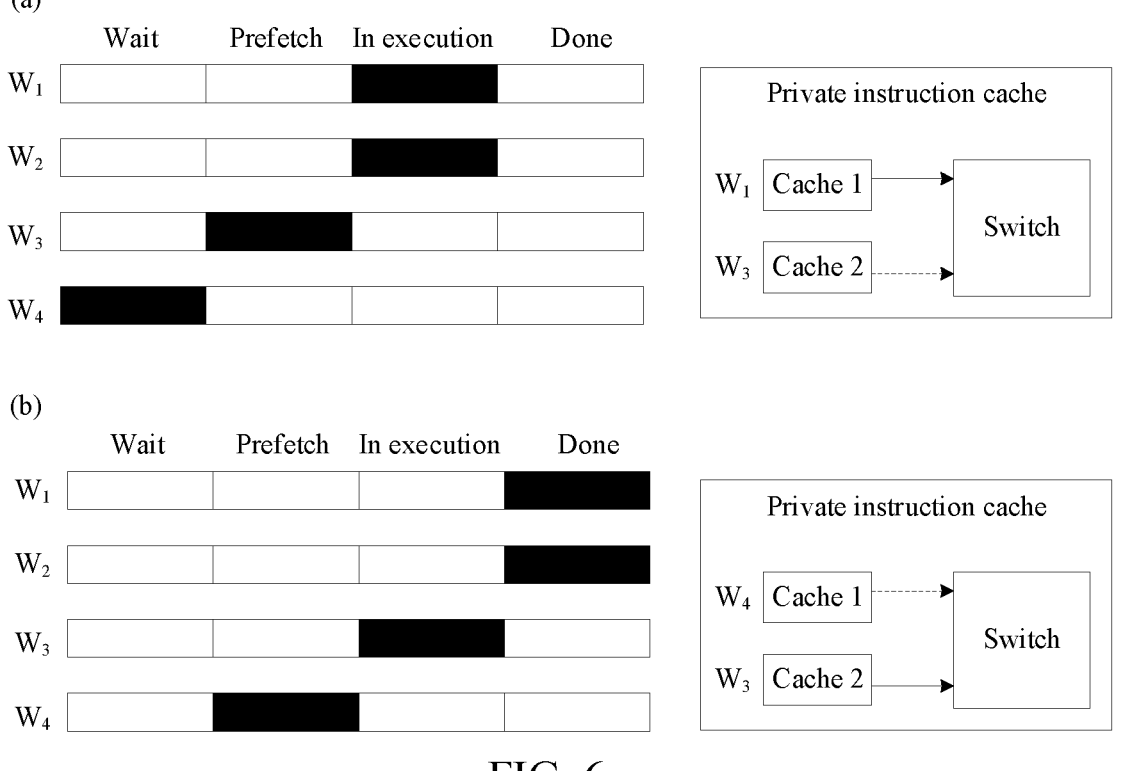
FIG. 6 is a schematic diagram of an instruction prefetch process according to this application.

Based on this process, a "prefetch" state may also be added to the foregoing state register. The scheduler 51 is further configured to store state information respectively corresponding to the n sub-circuits into the state register, state information of any sub-circuit being any one of the following: a wait state, a prefetch state, an in-execution state, and a done state. An example of this process is shown in FIG. 6. During the process, as shown in the part (a) of FIG. 6, when pre-circuits (that is, sub-circuits $W_1$ and $W_2$) of a sub-circuit $W_3$ are in-execution, an instruction corresponding to the sub-circuit $W_3$ is prefetched to an idle PIC (a cache 2 in FIG. 6) corresponding to a processing unit 1. As shown in the part (b) of FIG. 6, after execution of the sub-circuit $W_3$ starts, an instruction corresponding to a sub-circuit $W_4$ is prefetched to a PIC (a cache 1 in FIG. 6) where an instruction corresponding to $W_1$ is previously located. Based on this method, the processing unit only needs to perform a switch operation when switching the sub-circuits, and only one clock cycle is required.

Operations performed after instructions enter the processing unit 53 are roughly divided into the following steps: fetch the instructions, decode, generate operations, transmit the instructions to operation queues corresponding to qubits, and finally wait for emitting the instructions to an analog instrument according to timing information. In different quantum programs, qubits corresponding to different sub-circuits may change. For example, in the example of FIG. 3, after two groups of bits q0 and q1 and q3 and q4 respectively execute two RUS circuits, at a next moment, five bits may perform another task together. In this case, the scheduler 51 is required to perform reallocation. In the instructions corresponding to the sub-circuits, an instruction similar to indicating stop is required finally to indicate the end of the current sub-circuit. When executing this instruction, the processing unit 53 instructs the scheduler 51 to start an operation on the next task. In this case, the scheduler 51 then accesses the information register 55 to fetch an instruction of the next task from the instruction memory 52 to the PIC 54 of the processing unit 53.

The quantum control system provided in this application has a capability of dynamically allocating sub-circuits. The n sub-circuits included in the quantum circuit are dynamically allocated to the processing units 53 for execution, and each processing unit 53 has a capability of executing an instruction corresponding to any of the n sub-circuits. Because the processing unit 53 can process any instruction with high-level semantics, that is, different bits and different types of operations can be executed by the same processing unit 53, so that the quantum control system has the capability of dynamically allocating the sub-circuits. It can be seen from FIG. 5 that all operations on qubits are reorganized by an emitter located at the last position into bit operations related to an underlying analog instrument. For example, operations on the same bit are allocated to different analog channels, which allows dynamic allocation of sub-circuit modules in the entire architecture.

In a classical processor, the most important problem for a multi-core system is cache consistency, that is, how to ensure that data in a cache does not conflict when a plurality of processing units write/read data to the shared cache. Due to the need of processing classical auxiliary instructions, the quantum control system also needs to perform read and write operations on the register. However, in terms of current quantum applications, fewer classical registers are usually needed, and there is temporarily no need to use a unified register for storage. Therefore, in the quantum control system provided in this application, each processing unit has a respective independent register file, thereby avoiding the problem of cache consistency.

In addition, the number of processing units in a quantum control system represents a maximum number of sub-circuits that the quantum control processor can support for parallel processing. Obviously, when the quantum control system is specifically implemented on hardware, a specific value of the number depends on a size of a corresponding quantum circuit and requirements of a quantum program that needs to run, so that it is difficult to give a fixed value for all situations.

Based on the above, the quantum control system provided in this embodiment of this application adopts a solution of sub-circuit-level parallelism. A quantum circuit is divided into a plurality of sub-circuits, and a compiler generates a corresponding instruction for each sub-circuit. For the plurality of sub-circuits that can be executed in parallel in the quantum circuit, the instructions corresponding to the plurality of sub-circuits are executed in parallel by a plurality of processing units. Compared with a solution of bit-level parallelism, the solution of sub-circuit-level parallelism does not lead to a substantial increase in complexity as the number of qubits increases, and therefore has better scalability when facing more complex quantum applications and ever-increasing qubits.

In addition, by using the method of scheduling and executing at the sub-circuit level, task-level parallelism of a quantum circuit can be implemented at a control level. Such a method helps to implement a more complex quantum circuit with a higher depth and more bits, and provides higher scalability for the quantum architecture.

In addition, the quantum control system provided in this application adopts a central architecture, that is, all instructions are executed on a piece of hardware (for example, a QCP implemented by an FPGA), which can omit synchronization operations between hardware sub-modules, helping reduce complexity and reduce time consumption for instruction execution.

The foregoing describes the use of sub-circuit-level parallelism to reduce running time, so that the quantum control system has better scalability. The following describes an instruction execution method for quantum operation-level parallelism provided in this application, so as to further improve efficiency and accuracy of instruction execution on this basis.

In an architecture of a classical computer, an indicator called a cycles per instruction (CPI) is used to quantify performance of a computer processor. The indicator represents an average clock cycle required to process one instruction. For the classical computer, a lower CPI means better performance, because this indicates that a computer spends less time to complete one task. The most direct way to reduce the CPI is to excavate a capability of instruction-level parallelism, that is, if instructions are likely to be simultaneously processed without conflict with each other, some technical means may be used to increase parallelism of the processor. An ideal pipeline processor has a CPI of 1, and a processor using superscalar or VLIW technologies may be capable of reducing the CPI to be less than 1.

Figure 7:
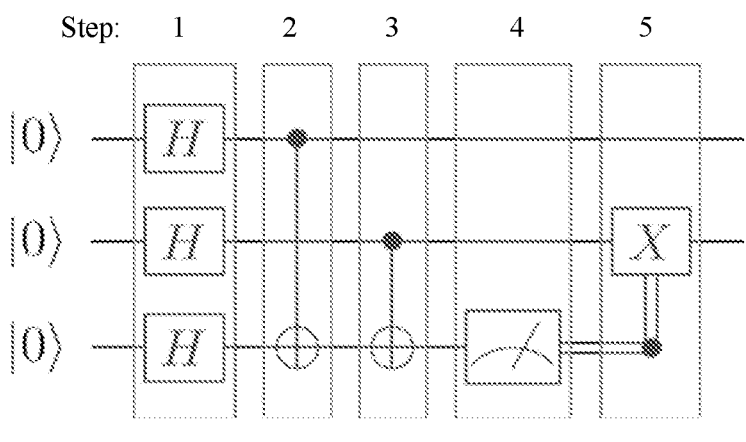
FIG. 7 exemplarily shows a schematic diagram of a quantum circuit prepared in an entangled state.

In this application, it is also hoped that the quantum instruction set and the QCP can reduce the CPI, but the purpose is different from that of the classical computer. Compared with a classical processor with a low CPI, a processor with a high CPI spends more time to complete running of a program, but this does not actually affect a running result of the program, that is, the running result of the program is still correct. However, for the quantum instruction set, if a required instruction processing result obtained by a quantum circuit within a specific period of time cannot be ensured, a final execution result of a quantum program is wrong (because qubits accumulate errors during waiting). To quantify this process, this application gives the following formula:

CES=(pipeline CEQI)*QICES+classical instruction cycles+classical control stalls+QCP conditional execution delay In the formula, cycles each step (CES) represents a time spent during processing of quantum operations in each step in a QCP. In this application, it is considered that this value is mainly composed of four parts: (1) A processing time of quantum instructions, that is, a time (which is 1 in an ideal case) spent by pipeline cycles each quantum instruction (CEQI) is multiplied by quantum instruction count each step (QICES). (2) A processing time of a classical instruction (that is, classical instruction cycles in the formula). (3) Pipeline suspension, such as a jump process, caused by a classical control process (that is, classic control stalls in the formula). (4) A delay that the QCP spends for conditional execution in a process of feedback control (that is, QCP conditional execution delay in the formula). For "each step" described herein, illustration is made by using an example in FIG. 7 in this application. FIG. 7 exemplarily shows a schematic diagram of a quantum circuit prepared in an entangled state. The quantum circuit in FIG. 7 may be divided into five steps, and in this application, performance of the QCP may be measured by computing CES in the five steps. Step 5 includes a feedback control process. Therefore, during computation, a case that the QCP processes a signal that is fed back needs to be added.

A design purpose of the quantum control system is to transmit a quantum operation in each step to a QPU in time. This purpose may be expressed by using the following timing ratio (TR):

$$TR = \frac{QCP \text{ time each step}}{QPU \text{ time each step}} = \frac{clock \text{ time} * CES}{gate \text{ time}}$$

Because the QPU can completely perform quantum operations in steps in parallel, a gate time may be used to represent a QPU time in this application. The QPU time is composed of a cycle time (that is, clock time in the foregoing formula) of the QCP multiplied by CES. TR is less than or equal to 1, which means that the QPU does not need to wait for the QCP when executing the quantum circuit, that is, additional errors are avoided.

In a superconducting system implemented in current technologies, the shortest quantum operation time with a length of about 20 ns is usually achieved by a single-bit quantum gate. For the QCP, this time is what needs to be achieved by using instruction-level parallelism. Scalability is the most important matter. As the number of qubits increases, the number of simultaneous operations also increases, but a duration for quantum gate operations does not increase.

Instructions in a quantum instruction set are mainly divided into quantum operation instructions (referred to as "quantum instructions") and classical auxiliary instructions (referred to as "classical instructions"). The quantum instructions are program instructions for operating qubits, and the classical instructions are program instructions other than those used for operating the qubits. The quantum instructions and the classical instructions are both program instructions in the classical instruction set indicated by a classical processor, and are only divided according to functionality of whether to operate the qubits. The quantum instructions mainly refer to instructions related to operations to be performed on quantum circuits or qubits, for example, single-bit gates, double-bit gates, and measurement instructions. The classical instructions refer to instructions used for implementing program flow control, which mainly include register operations such as simple addition, subtraction, and comparison, and branch jump operations. Based on the classical instructions, the quantum instruction set can well support semantics of high-level languages such as loops and recursion, and simplify difficulty in describing quantum programs, but occurrence frequencies of the semantics are relatively low and are mainly at the start and end of a program. More importantly, the instructions may support feedback control operations, and occurrence frequencies of such feedback control operations are higher, which are emphatically discussed in the next part.

Theoretically, the quantum instructions are a type of instructions that are easy to be parallelized. This is mainly because the essence of quantum computation is an in-memory computing structure, that is, a qubit is a unit for storing data. During computation, various quantum operations are provided from the outside to the qubit as an input to complete corresponding operations. This process is opposite to that of classical computation. In classical computation, a circuit represents an operation, and data is inputted into the circuit during computation, to obtain outputted data. Due to the characteristic of quantum computation, there are no problems such as data hazards that need to be considered when instructions are parallel in classical computation, that is, operations performed on different qubits can be parallel essentially.

Although the quantum instructions are easy to be parallelized in theory, when the quantum instruction set is processed in a real experimental environment, it is difficult to achieve such an ideal situation, and the most essential reason is the addition of classical instructions such as feedback control.

To improve parallelism of the quantum instruction set, this application needs to adopt a plurality of execution units in the quantum control system to process the quantum instructions. As described above, there are no problems such as data dependency between quantum instructions, so that almost no additional hardware overhead is required for risk detection, that is, there is no big difference in difficulty of hardware implementation of a superscalar and a VLIW. In contrast, the use of a superscalar structure may not change a width of a single instruction, avoiding the use of variable-length instruction words, and has more advantages over the VLIW. Therefore, this application provides a quantum superscalar structure to improve parallelism of quantum operation instruction-level of the quantum control system. By using the plurality of execution units, the first term in the computation formula of CES above may be modified to:

$$\frac{\text{pipeline } CEQI}{\text{number of execution units}} * QICES$$

where number of execution units represents the number of execution units.

FIG. 8 shows an example of a superscalar structure with four execution units. There are one classical pipeline 53a and four quantum pipelines 53b in each processing unit 53 under a multi-core quantum control system, which respectively perform operations such as decoding and execution on classical instructions and quantum instructions. Because the plurality of execution units do not involve the classical instructions, the number of classical pipelines 53a is fixed to 1, that is, each clock cycle can process at most one classical instruction, and the four quantum pipelines 53b can respectively process four quantum instructions. The main difficulty of this structure is how to fetch instructions to the pipelines. In view of this, a pre-decoder 53c is designed in the processing unit 53 in this application.

A target processing unit is used as an example. The target processing unit (for example, a pre-decoder of the target processing unit) obtains m instructions corresponding to a target sub-circuit from a PIC corresponding to the target processing unit, m being a positive integer equal to the number of quantum pipelines included in the target processing unit. Then, when the m instructions are all quantum instructions, the pre-decoder distributes the m instructions to m quantum pipelines for processing, each quantum pipeline being used for processing one quantum instruction.

In some embodiments, when there are classical instructions in the m instructions, the pre-decoder distributes the classical instructions to the classical pipelines one by one in order for processing. In some embodiments, if there are a quantum instructions whose execution orders are before the classical instructions, the pre-decoder distributes the a quantum instructions to a quantum pipelines, each quantum pipeline being used for processing one quantum instruction, and a being a positive integer. If there are b quantum instructions whose execution orders are after the classical instructions, the pre-decoder stores the b quantum instructions into remaining instruction caches, b being a positive integer.

In the superscalar structure with four execution units (which refer to quantum execution units used for executing quantum instructions) shown in FIG. 8, after fetching data from an instruction cache and a flag bit register (which is used for storing a flag bit of each instruction, and the flag bit is used for indicating whether the instruction is a quantum instruction or a classical instruction), the pre-decoder 53c needs to perform a distribution selection. In the example in which there are four execution units, four instructions are fixedly fetched in each instruction fetch, that is, a value of each program counter is increased by 4 in a default case. There are several cases of the four retrieved instructions as follows:

(a) The four retrieved instructions are all quantum instructions. In this case, the four instructions are directly distributed to the four quantum pipelines for processing.

(b) The four retrieved instructions include classical instructions. The classical instructions mean that the retrieved instructions cannot be entirely processed in parallel at a time. Sequential quantum instructions before the classical instructions are still transmitted to the quantum pipelines for processing at a time, while the classical instructions can only be processed one by one. This also means that not all the four instructions fetched in this cycle are transmitted out. In a next cycle, the to-be-transmitted instructions and part of newly retrieved instructions are recombined into four instructions for transmission and check, additional instructions are stored in an instruction cache, and a depth of the instruction cache needs to be at least 4. When a value in the instruction register is 4, the instruction fetch may be suspended for one cycle, because regardless of the situation, the number of instructions in the current instruction register has satisfied requirements, and continuous instruction fetch may cause an overflow of the instruction register. In addition, in this application, it is not recommended to modify the value in the program counter according to the value in the instruction register, because this causes additional delays.

Based on the above, this application provides a type of parallel processing on quantum operation instruction-level performed using a quantum superscalar architecture, so as to provide a required quantum operation instruction for a QPU within a specific period of time, thereby ensuring efficiency and accuracy of instruction execution.

An exemplary embodiment of this application further provides a QCP. The QCP has the quantum control system described in the above embodiment. In some embodiments, the QCP may be an FPGA or an ASIC.

FIG. 9 is a flowchart of a quantum instruction set execution method according to an exemplary embodiment of this application. The method may be applied to the quantum control system described in the above embodiment. The method may include the following steps:

Step 910: A scheduler determines k sub-circuits executed in parallel in a quantum circuit, k being an integer greater than 1 and not greater than n.

In some embodiments, the scheduler reads sub-circuit timing information from an information register, and determines, based on the sub-circuit timing information, the k sub-circuits executed in parallel in the quantum circuit.

In some embodiments, the sub-circuit timing information includes priorities respectively corresponding to n sub-circuits, where sub-circuits with the same priority can be executed in parallel, and sub-circuits with different priorities cannot be executed in parallel.

Step 920: The scheduler obtains instructions respectively corresponding to the k sub-circuits from an instruction memory.

In some embodiments, the scheduler obtains instruction address information respectively corresponding to the k sub-circuits from the information register, and obtains the instructions respectively corresponding to the k sub-circuits from the instruction memory based on the instruction address information respectively corresponding to the k sub-circuits.

Step 930: The scheduler respectively stores the instructions respectively corresponding to the k sub-circuits into PICs respectively corresponding to k processing units.

Step 940: A target processing unit of the k processing units obtains an instruction corresponding to a target sub-circuit of the k sub-circuits from a PIC corresponding to the target processing unit.

Step 950: The target processing unit executes the instruction corresponding to the target sub-circuit, the k processing units executing respective corresponding instructions in parallel.

In an exemplary embodiment, when the k sub-circuits are in an in-execution state, the scheduler determines a to-be-executed sub-circuit executed after the k sub-circuits in the quantum circuit; obtain an instruction corresponding to the to-be-executed sub-circuit from the instruction memory; and store the instruction corresponding to the to-be-executed sub-circuit into an idle PIC corresponding to an execution processing unit, the execution processing unit belonging to the k processing units.

In some embodiments, the scheduler stores state information respectively corresponding to the n sub-circuits into a state register, state information of any sub-circuit being any one of the following: a wait state, a prefetch state, an in-execution state, and a done state.

In an exemplary embodiment, the target processing unit obtains m instructions corresponding to the target sub-circuit from the PIC corresponding to the target processing unit, m being a positive integer equal to the number of quantum pipelines included in the target processing unit; and when the m instructions are all quantum instructions, distributes the m instructions to m quantum pipelines for processing, each quantum pipeline being used for processing one quantum instruction, the quantum instruction being a program instruction used for operating a qubit.

In some embodiments, when there are classical instructions in the m instructions, the target processing unit distributes the classical instructions to classical pipelines one by one in order for processing; the classical instructions being program instructions other than that used for operating the qubit.

In some embodiments, when there are a quantum instructions whose execution orders are before the classical instructions, the target processing unit distributes the a quantum instructions to a quantum pipelines, each quantum pipeline being used for processing one quantum instruction, and a being a positive integer; and when there are b quantum instructions whose execution orders are after the classical instructions, the target processing unit stores the b quantum instructions into remaining instruction caches, b being a positive integer.

For details that are not described in the method embodiments of this application, reference may be made to foregoing descriptions related to the embodiments of the quantum control system, and details are not described herein again.

Based on the above, the quantum instruction set execution method provided in this application adopts a solution of sub-circuit-level parallelism. A quantum circuit is divided into a plurality of sub-circuits, and a compiler generates a corresponding instruction for each sub-circuit. For the plurality of sub-circuits that can be executed in parallel in the quantum circuit, the instructions corresponding to the plurality of sub-circuits are executed in parallel by a plurality of processing units. Compared with the solution of bit-level parallelism, the solution of sub-circuit-level parallelism does not lead to a substantial increase in complexity as the number of qubits increases, and therefore has better scalability. In addition, in an optional embodiment of this application, a type of parallel processing on quantum operation instruction-level performed using a quantum superscalar architecture is further provided, so as to provide a required quantum instruction for a QPU within a specific period of time. In a final design solution of the quantum control system, the quantum architecture can be expanded to control hundreds of bits or more.

"Plurality of" mentioned in the specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A quantum control system, comprising: a scheduler, an instruction memory, an information register, a plurality of processing units, and private instruction caches (PICs) respectively corresponding to the plurality of processing units and communicatively coupled to the instruction memory, the instruction memory storing a quantum instruction set generated by compiling a quantum program corresponding to a quantum circuit, the quantum circuit comprising n sub-circuits, and the quantum instruction set comprising instructions respectively corresponding to the n sub-circuits, n being an integer greater than 1;

the scheduler being configured to:
  determine k sub-circuits executed in parallel in the quantum circuit, k being an integer greater than 1 and not greater than n;
  obtain instructions respectively corresponding to the k sub-circuits from the instruction memory based on instruction address information respectively corresponding to the k sub-circuits; and
  respectively store the instructions respectively corresponding to the k sub-circuits into PICs corresponding to k processing units; and
a target processing unit of the k processing units being configured to:
  obtain m instructions corresponding to a target sub-circuit of the k sub-circuits from a PIC corresponding to the target processing unit, m being a positive integer equal to the number of quantum pipelines comprised in the target processing unit;
  distribute, when the m instructions are all quantum instructions, the m instructions to m quantum pipelines for processing, each quantum pipeline being used for processing one quantum instruction, the quantum instruction being a program instruction used for operating a qubit;
  distribute, when there are classical instructions in the m instructions, the classical instructions to classical pipelines one by one in order for processing, the classical instructions being program instructions other than that used for operating the qubit;
  distribute, when there are p quantum instructions whose execution orders are before the classical instructions, the p quantum instructions to p quantum pipelines, each quantum pipeline being used for processing one quantum instruction, and p being a positive integer;
  store, when there are q quantum instructions whose execution orders are after the classical instructions, the q quantum instructions into remaining instruction caches, q being a positive integer; and
  execute the m instructions corresponding to the target sub-circuit, the k processing units executing respective corresponding instructions on the k sub-circuits in parallel.

2. The quantum control system according to claim 1, wherein the scheduler is further configured to:
  determine, when the k sub-circuits are in an in-execution state, a to-be-executed sub-circuit executed after the k sub-circuits in the quantum circuit;

obtain an instruction corresponding to the to-be-executed sub-circuit from the instruction memory; and
  store the instruction corresponding to the to-be-executed sub-circuit into an idle second PIC corresponding to an execution processing unit, the execution processing unit belonging to the k processing units.

3. The quantum control system according to claim 2, wherein the scheduler is further configured to:
  store state information respectively corresponding to the n sub-circuits into a state register, state information of any sub-circuit being any one of the following: a wait state, a prefetch state, an in-execution state, and a done state.

4. The quantum control system according to claim 1, wherein the n sub-circuits are dynamically allocated to the processing units for execution, and each processing unit has a capability of executing an instruction corresponding to any one of the n sub-circuits.

5. The quantum control system according to claim 1, wherein each of the plurality of processing units is configured with a first PIC storing an instruction corresponding to a sub-circuit that is in-execution and a second PIC storing an instruction corresponding to a next to-be-executed sub-circuit.

6. The quantum control system according to claim 1, wherein the target processing unit of the k processing units is configured to execute the instruction corresponding to the target sub-circuit by converting a digital signal corresponding to the instruction into an analog microwave waveform and controlling the target sub-circuit using the analog microwave waveform.

7. The quantum control system according to claim 1, wherein the information register stores the following information:
  (i) sub-circuit timing information corresponding to the n sub-circuits in the quantum circuit, the sub-circuit timing information comprising a priority respectively assigned to each of the n sub-circuits being used for indicating an execution sequence of the n sub-circuits, wherein sub-circuits with the same priority can be executed in parallel and sub-circuits with different priorities cannot be executed in parallel, and
  (ii) instruction address information respectively corresponding to the n sub-circuits, the instruction address information being used for indicating a storage address of an instruction corresponding to a respective one of the n sub-circuits in the instruction memory.

8. The quantum control system according to claim 7, wherein the scheduler is configured to:
  read the sub-circuit timing information from the information register; and
  determine, based on the sub-circuit timing information, the k sub-circuits executed in parallel in the quantum circuit.

9. The quantum control system according to claim 8, wherein the scheduler is configured to:
  obtain instruction address information respectively corresponding to the k sub-circuits from the information register; and
  obtain the instructions respectively corresponding to the k sub-circuits from the instruction memory based on the instruction address information respectively corresponding to the k sub-circuits.

10. The quantum control system according to claim 8, wherein the sub-circuit timing information comprises priorities respectively corresponding to the n sub-circuits, wherein the k sub-circuits have the same priority.

11. A quantum instruction set execution method performed by a quantum control system, the quantum control system comprising: a scheduler, an instruction memory, an information register, a plurality of processing units, and private instruction caches (PICs) respectively corresponding to the plurality of processing units, the instruction memory storing a quantum instruction set generated by compiling a quantum program corresponding to a quantum circuit, the quantum circuit comprising n sub-circuits, and the quantum instruction set comprising instructions respectively corresponding to the n sub-circuits, n being an integer greater than 1, determining, by the scheduler, k sub-circuits executed in parallel in the quantum circuit, k being an integer greater than 1 and not greater than n;

obtaining, by the scheduler, instructions respectively corresponding to the k sub-circuits from the instruction memory based on instruction address information respectively corresponding to the k sub-circuits;

respectively storing, by the scheduler, the instructions respectively corresponding to the k sub-circuits into PICs respectively corresponding to k processing units;

obtaining, by a target processing unit of the k processing units, m instructions corresponding to a target sub-circuit of the k sub-circuits from a PIC corresponding to the target processing unit, m being a positive integer equal to the number of quantum pipelines comprised in the target processing unit;

distributing, by the target processing unit, when the m instructions are all quantum instructions, the m instructions to m quantum pipelines for processing, each quantum pipeline being used for processing one quantum instruction, the quantum instruction being a program instruction used for operating a qubit;

distributing, by the target processing unit, when there are classical instructions in the m instructions, the classical instructions to classical pipelines one by one in order for processing, the classical instructions being program instructions other than that used for operating the qubit;

distributing, by the target processing unit, when there are p quantum instructions whose execution orders are before the classical instructions, the p quantum instructions to p quantum pipelines, each quantum pipeline being used for processing one quantum instruction, and p being a positive integer;

storing, by the target processing unit, when there are q quantum instructions whose execution orders are after the classical instructions, the q quantum instructions into remaining instruction caches, q being a positive integer; and executing, by the k processing units, respective corresponding instructions on the k sub-circuits in parallel.

12. The quantum instruction set execution method according to claim 11, further comprising:

determining, by the scheduler, when the k sub-circuits are in an in-execution state, a to-be-executed sub-circuit executed after the k sub-circuits in the quantum circuit;

obtaining, by the scheduler, an instruction corresponding to the to-be-executed sub-circuit from the instruction memory; and storing, by the scheduler, the instruction corresponding to the to-be-executed sub-circuit into an idle second PIC corresponding to an execution processing unit, the execution processing unit belonging to the k processing units.

13. The quantum instruction set execution method according to claim 12, further comprising:

storing, by the scheduler, state information respectively corresponding to the n sub-circuits into a state register, state information of any sub-circuit being any one of the following: a wait state, a prefetch state, an in-execution state, and a done state.

14. The quantum instruction set execution method according to claim 11, wherein the n sub-circuits are dynamically allocated to the processing units for execution, and each processing unit has a capability of executing an instruction corresponding to any one of the n sub-circuits.

15. The quantum instruction set execution method according to claim 11, wherein each of the plurality of processing units is configured with a first PIC storing an instruction corresponding to a sub-circuit that is in-execution and a second PIC storing an instruction corresponding to a next to-be-executed sub-circuit.

16. The quantum instruction set execution method according to claim 11, wherein the target processing unit of the k processing units is configured to execute the instruction corresponding to the target sub-circuit by converting a digital signal corresponding to the instruction into an analog microwave waveform and controlling the target sub-circuit using the analog microwave waveform.

17. The quantum instruction set execution method according to claim 11, wherein the information register stores the following information:

(i) sub-circuit timing information corresponding to the n sub-circuits in the quantum circuit, the sub-circuit timing information comprising a priority respectively assigned to each of the n sub-circuits being used for indicating an execution sequence of the n sub-circuits, wherein sub-circuits with the same priority can be executed in parallel and sub-circuits with different priorities cannot be executed in parallel, and (ii) instruction address information respectively corresponding to the n sub-circuits, the instruction address information being used for indicating a storage address of an instruction corresponding to a respective one of the n sub-circuits in the instruction memory.

18. The quantum instruction set execution method according to claim 17, wherein the scheduler is configured to:

read the sub-circuit timing information from the information register; and determine, based on the sub-circuit timing information, the k sub-circuits executed in parallel in the quantum circuit.

19. The quantum instruction set execution method according to claim 18, wherein the scheduler is configured to:

obtain instruction address information respectively corresponding to the k sub-circuits from the information register; and obtain the instructions respectively corresponding to the k sub-circuits from the instruction memory based on the instruction address information respectively corresponding to the k sub-circuits.

20. The quantum instruction set execution method according to claim 19, wherein the sub-circuit timing information comprises priorities respectively corresponding to the n sub-circuits, wherein the k sub-circuits have the same priority.

* * * * *